United States Patent
Maki

[11] Patent Number: 6,112,611
[45] Date of Patent: Sep. 5, 2000

[54] GEAR WITH MODIFIED TOOTH SURFACE AND GEAR TOOTH SURFACE MODIFICATION METHOD

[75] Inventor: Hiroki Maki, Toyota, Japan

[73] Assignee: Toyota Jidosha Kabushiki Kaisha, Toyota, Japan

[21] Appl. No.: 09/080,284

[22] Filed: May 18, 1998

[30] Foreign Application Priority Data

May 20, 1997 [JP] Japan ..................................... 9-129768

[51] Int. Cl.$^7$ .............................. B23F 9/00; B23F 19/00
[52] U.S. Cl. .............................. 74/462; 74/461; 29/893; 29/893.3
[58] Field of Search ........................ 74/461, 462; 29/893, 29/893.3

[56] References Cited

U.S. PATENT DOCUMENTS

| | | | |
|---|---|---|---|
| 2,230,418 | 2/1941 | Wildhaber | 74/462 |
| 2,335,504 | 11/1943 | Gazda | 74/462 |
| 4,552,030 | 11/1985 | Szecsei | 74/462 |
| 5,083,474 | 1/1992 | Rouverl | 74/461 |
| 5,271,289 | 12/1993 | Baxter, Jr. | 74/462 |
| 5,315,790 | 5/1994 | Kish et al. | 74/462 |
| 5,454,702 | 10/1995 | Weidhass | 74/462 |

FOREIGN PATENT DOCUMENTS

WO 95/16153  6/1995  WIPO.

OTHER PUBLICATIONS

"Collection of Articles, vol. 40, No. 340, p. 3514–p. 3522", The Japan Society of Mechanical Engineers, Nov. 23, 1998.
"MPT" 91 Collection of Articles, p. 92–p. 97., Dec. 1987.

*Primary Examiner*—David A. Bucci
*Assistant Examiner*—William C. Joyce
*Attorney, Agent, or Firm*—Oblon, Spivak, McClelland, Maier, Neustadt, P.C.

[57] ABSTRACT

A curvature of a locus of contact points at a higher torque value is increased such that the torque-dependent characteristic of the working transmission error assumes a minimum value in the vicinity of a working torque value $T_1$ at the tooth surface position corresponding to the working torque value $T_1$, in the vicinity of a working torque value $T_3$ at the tooth surface position corresponding to the working torque value $T_3$, and in the vicinity of a working torque value $T_5$ at the tooth surface position corresponding to the working torque value $T_5$. As a consequence, the change in the working transmission error at the working torque is minimized making it possible to reduce the working transmission error in a wide working torque range.

2 Claims, 7 Drawing Sheets

0 Nm $T_1$ Nm $T_3$ Nm $T_5$ Nm

0 Nm $T_1$ Nm $T_3$ Nm $T_5$ Nm

GEAR WITH MODIFIED TOOTH SURFACE AND GEAR TOOTH SURFACE MODIFICATION METHOD

BACKGROUND OF THE INVENTION

1. Field of the Invention

The present invention relates to a gear tooth surface modification, and more in particular to a technique for suppressing variation in working transmission error owing to working torque difference such that the working transmission error can be reduced in a wide working torque range.

2. Description of the Related Art

The "tip relief" and the "bias-in" are widely known as the techniques for reducing the transmission error that is exciting force to cause gear noise, as described in "Collection of Articles, Vol. 40, No. 340, p.3514", The Japan Society of Mechanical Engineers, and "MPT 91 Collection of Articles", p.92, respectively. The tip relief technique (lacking tooth tip portion not as not to contact a tooth of a mating gear) is intended to cancel variation caused by working rigidity of the teeth by adding modification amount to each tip of the teeth (corresponding to the starting/end working point of the helical gear) of the driving and driven gears, thereby minimizing the exciting force at a target torque. Meanwhile the bias-in technique (shape of tooth width is gradually charged, and contacting point becomes longer along with working direction) is intended to utilize the gear specifications, especially the contact ratio, effectively by continuously changing the pressure angle error across the tooth width such that each gear tooth is kept in contact with its mating tooth from the starting working point to the end working point for a time as long as possible. In this technique, the more the number of gear teeth simultaneously in contact increases, the less the adverse effect of each transmission error becomes. The working transmission error as a rotational error of a pair of gears meshed with each other may be expressed, for example, by a maximum lead/lag (rad) of a driven gear when a driving gear is rotated at a predetermined rate.

In the above-mentioned general technique of gear tooth surface modification, however, the torque-dependent characteristic of the transmission error may cause the problem as described below. That is, the gear noises can be reduced under predetermined operating conditions but are not always sufficiently reduced under other operating conditions where the working torque (load torque) is different. According to the above-described technique, the gear profile is modified on the assumption that the working torque is kept constant. Accordingly when the working torque changes, the resultant elastic deformation of supporting members or flexural deformation of the tooth itself changes the position of the tooth surface. As the locus of contact points changes when a position of the tooth surface changes, a target characteristics cannot be obtained. The locus of contact points is a line defined by plotting points on the tooth surface where gear teeth come into contact with each other earliest at each rotational position in conjunction with the gear rotation.

SUMMARY OF THE INVENTION

The present invention has been developed with the above-mentioned situation as the background, and the object thereof is to minimize variations in working transmission error owing to the difference in working torque and thereby to reduce the working transmission error in a wide working torque range.

In order to achieve this object, according to a first aspect of the invention, there is provided a gear with modified tooth surface having a tooth surface configured such that a convexity of a locus of points contacting a tooth of a mating gear has a curvature which varies in dependence on a working torque produced on the tooth surface by engagement with the mating gear.

According to a second aspect of the invention, there is provided a gear with modified tooth surface on which the locus of points contacted by the teeth of the mating gear has a larger curvature of convexity at higher working torque.

According to a third aspect of the invention, there is provided a method of gear tooth surface modification including steps of setting a position of a tooth surface at each of a plurality of working torque values that change owing to elastic deformation of supporting members, setting a different locus of contact points at each of a plurality of the working torque values that change owing to elastic deformation of the supporting members, and setting a curvature of convexity of a locus of contact points so as to substantially minimize a torque-dependent characteristic of a working transmission error at each of a plurality of the working torque values corresponding to different positions of the tooth surface of the gear rotated in mesh with a mating gear.

According to a fourth aspect of the invention, there is provided a gear with modified tooth surface in which a position of a tooth surface that changes with a working torque owing to elastic deformation of supporting members is set at each of a plurality of working torque values, a different locus of contact points is set at each of a plurality of the working torque values that change owing to elastic deformation of the supporting members, and a curvature of a convexity of a locus of contact points is set so as to substantially minimize a torque-dependent characteristic of a working transmission error at each of a plurality of the working torque values corresponding to different positions of the tooth surface of the gear rotated in mesh with a mating gear. The aforementioned gear is machined and fabricated based on the convexity.

With the gear according to the first aspect of the invention, for example, if the curvature is larger for higher working torques, accordingly the elastic deformation of the tooth surface due to the working torque and the convexity are offset with each other, thereby reducing the change in working transmission error caused by difference in the working torque.

With the gear according to the second aspect of the invention, attention is paid to the fact that the locus of contact points changes due to the elastic deformation of the supporting members or the flexural deformation of the tooth as the working torque undergoes a change, the convexity of the locus of points on a tooth of a gear contacting a tooth of the mating gear has a larger curvature at a higher working torque in engaging the mating gear. Accordingly the elastic deformation of the tooth surface due to the working torque and the convexity are offset with each other, thereby reducing the change in working transmission error caused by difference in the working torque. By appropriately determining the curvature of the convexity of the locus of contact points at each working torque, the working transmission error can be reduced in a wide working torque range.

With the tooth surface modification method according to the third aspect of the invention, the curvature of the convexity of each locus of contact points is set in such a manner as to substantially minimize the torque-dependent characteristic of the transmission error at each working torque value with which the gear having a tooth surface position corresponding to the particular working torque value is rotated in mesh with the mating gear. The higher the working torque becomes, the larger the elastic deformation of the tooth surface becomes. Generally, therefore, the locus of contact points corresponding to a higher working torque has a larger curvature of convexity, resulting in a gear having a similar tooth surface to that of the first aspect of the invention. Therefore, this method also reduces variations in working transmission error caused by difference in the working torque. Further, according to this aspect of the invention, the curvature of the convexity is set in such a manner as to substantially minimize the torque-dependent characteristic of the working transmission error at each of a plurality of working torque values corresponding to a plurality of different tooth surface positions, and therefore the working transmission error can be substantially minimized in a wide working torque range.

With the gear with modified tooth surface according to the fourth aspect of the invention, the working transmission error can be reduced in a wide working torque range by appropriately determining the curvature of the convexity of the locus of contact points at each working torque.

DESCRIPTION OF THE PREFERRED EMBODIMENTS

Figure 1:
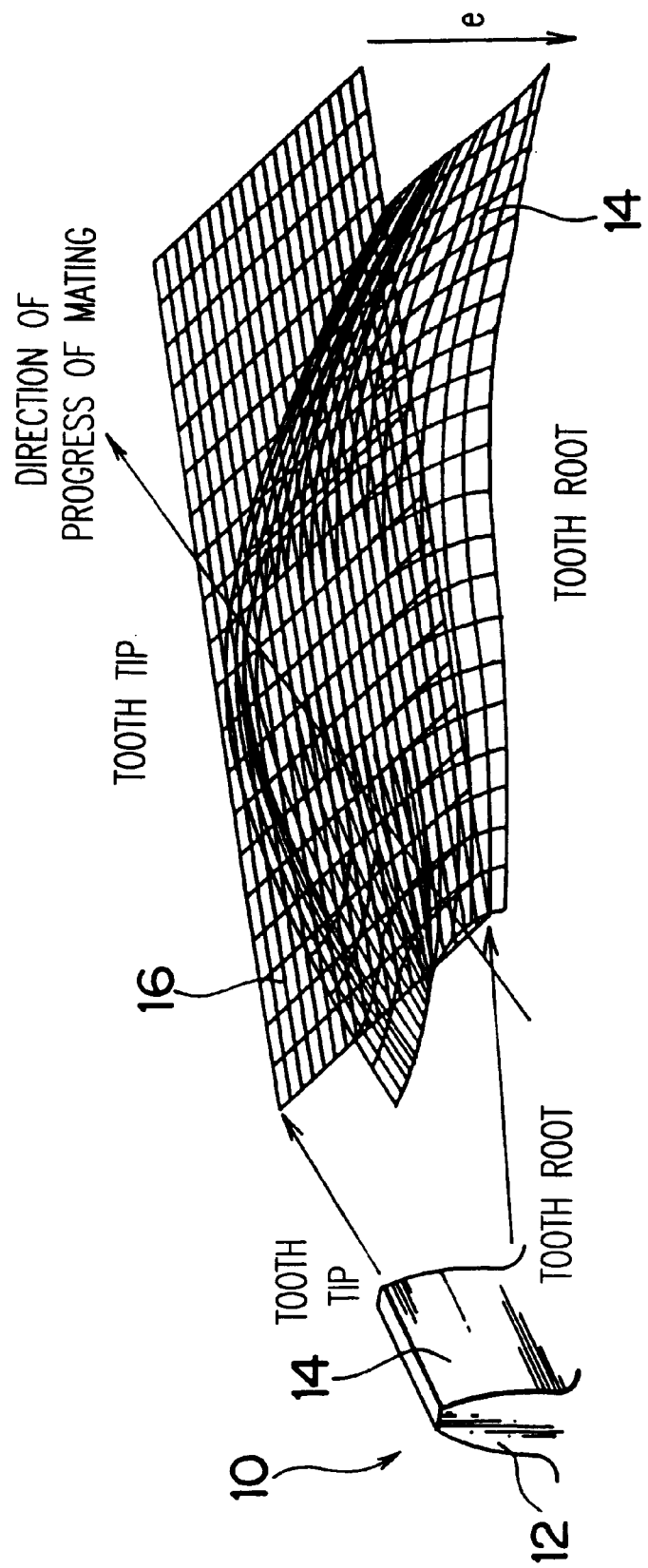
FIG. 1 is a diagram for explaining a modified tooth surface of a gear according to an embodiment of the invention.

The present invention is suitably applicable not only to gears used in a wide working torque range, for example, those employed in the transmission system of automobiles, but also to various gears where working torque in operation is not specified.

As the gear to which the invention is applied, an involute gear basically forming an involute curve along the plane perpendicular to the axis can be used. The invention can also find a suitable application in a spur gear having a lead parallel to the axis of which the tooth surface position may change due to the elastic deformation of supporting members, as well as in a helical gear. The gear pair with intersecting axes and the bevel gear are other possible applications.

Preferably a locus of contact points that changes in conjunction with the difference in the working torque is set in consideration of the position change in the tooth surface (gear) owing to elastic deformation of supporting members, the flexural deformation of the tooth or the like. For example, the locus can be set in consideration of the structure and material (rigidity) of the supporting member, the module or the material (rigidity) of the gear tooth and the like. It is desirable to use as many parameters that affect the change in the tooth surface position as many as possible. However, the locus of contact points can be set in consideration of only one of these parameters. Preferably the locus of contact points is set to coincide with the locus of actual contact points of a gear rotating in mesh with the mating gear. In a first aspect of the invention, it may be allowable as far as the curvature of convexity of the locus of contact points becomes larger as the level of working torque becomes higher. At a stage of modifying the tooth surface according to a second aspect of the invention, the locus of actual contact points changes depending on the curvature of the convexity. The locus of contact points for which the curvature is appropriately set, therefore, does not necessarily coincide with that of actual contact points, and a predetermined locus can be set at each working torque.

The positional change of the tooth surface due to elastic deformation of supporting members or the like may be expressed, for example, by a inclination error due to gear axis inclination or by a deviation error caused by a twisted gear axis. The tooth surface position, thus, can be defined by a pressure angle error or by a lead error.

Preferably the tooth surface modification technique according to the second aspect of the invention is implemented automatically by means of a computer having a machine-readable medium with a program recorded therein for sequential execution of the steps. The steps can alternatively be executed manually by the workers sequentially using the computer. Nevertheless, the torque-dependent characteristic of the transmission error, i.e. the value of the transmission error resulting from changing the working torque sequentially, is desirably determined automatically by the computer in accordance with a preset simulation program. The locus of contact points for setting the curvature of the convexity is not necessarily in exact agreement with the locus of contact points for corresponding values of the working torque used to determine the torque-dependent characteristic of the working transmission error.

When setting the curvature of the convexity according to the third aspect of the invention, it is assumed that the torque associated with a minimum value of the working transmission error as a torque-dependent characteristic thereof is larger than the working torque corresponding to the tooth surface position associated with it. In such a case, the resulting excessively large curvature can be corrected by reducing the curvature of the convexity of the tooth surface on the corresponding locus of contact points. Conversely, it is assumed that the torque associated with a minimum of the working transmission error as a torque-dependent characteristic thereof is smaller than the working torque corresponding to the tooth surface position associated with it. In such a case, the resulting excessively small curvature can be corrected by increasing the curvature of the convexity of the tooth surface on the corresponding locus of contact points. In this way, even when the locus of contact points for which the curvature is set does not coincide with the actual locus of contact points of the gear in rotation, the curvature of the convexity of the locus of actual contact points normally becomes larger at higher working torque as in the first aspect of the invention.

The third aspect of the invention is one of examples of a tooth surface modification technique for producing a preferable tooth surface of the gear according to the first aspect of the invention. When designing a gear according to the first aspect of the invention, therefore, any tooth surface modification technique can be employed as far as the curvature of the convexity of the locus of contact points becomes larger at higher working torque.

A fourth aspect of the invention concerns a gear fabricated as an application of the third aspect of the invention.

An embodiment of the invention will be described in detail with reference to the drawings FIG. 1 is a diagram for explaining a modified profile of a tooth surface 14 of a tooth 12 of a gear 10 constituting a helical gear or a spur gear according to an embodiment of the invention. The tooth surface is modified by assigning a modification amount (error amount) e in the direction normal to grid points appropriately set in a flat plane representing a reference involute tooth surface 16. The position of the tooth surface 14 changes as shown in (a) to (d) in FIG. 2 in accordance with the working torque T (Nm)=0, $T_1$, $T_3$, $T_5$ respectively owing to misalignment resulting from elastic deformation of the supporting members (case, shaft, bearing, etc.) of the gear. Concurrently the loci 20a to 20d of contact points (which are hereinafter simply referred to as loci 20 of contact points unless otherwise specified) under the working torque 0, $T_1$, $T_3$, $T_5$ also change as shown in (a) to (d) in FIG. 3. The working torque values hold the relation $0 < T_1 < T_3 < T_5$. FIG. 2 shows a positional change of the tooth surface 14 assuming that the position of the reference tooth surface 16 is kept constant.

The positional change shown in FIG. 2 is defined as a change in the lead error, i.e. the change in inclination angle of the tooth surface 14 in direction of the tooth width, on the assumption that the misalignment error is caused by elastic deformation of the gear supporting members. The profile of the tooth surface 14 itself remains unchanged. Each inclination angle (lead error) at the working torque $T_1$, $T_3$, $T_5$ may be determined by experiment, by simulation or by calculation in consideration of structure and material (rigidity) of the gear-supporting members. The flexural deformation of the tooth 12 itself can also be considered. According to this embodiment, the fundamental position of the tooth surface 14 is determined in such a manner that the tooth surface 14 assumes the right position at the working torque in the vicinity of $T_3$.

FIG. 3 shows the locus 20 of contact points, plotted by a plurality of circles [○], of a pair of teeth 12 rotating in mesh with each other. The range of the locus of actual contact points, which covers the outer peripheral edge of the tooth surface 14, is predetermined within the surface of the tooth surface 14 in consideration of the contact action of adjacent teeth. For the portion represented by the locus 20 of contact points in a light load range due to a small working torque T and hence a small elastic deformation, the curvature of the convexity of the tooth surface 14 is set to a small value so as to offset the elastic deformation of the tooth surface due to the particular light load. For the portion represented by the locus 20 of contact points in a heavy load area due to a large working torque T and hence a large elastic deformation, in contrast, the curvature of the convexity of the tooth surface 14 is set to a large value so as to offset the elastic deformation of the tooth surface due to particular heavy load. Specifically, as the locus of contact points changes from 20a to 20d sequentially, the curvature of the convexity on each locus 20 increases gently. Each portion of the loci 20a to 20d of contact points is three-dimensional smoothly connected.

Figure 2A:
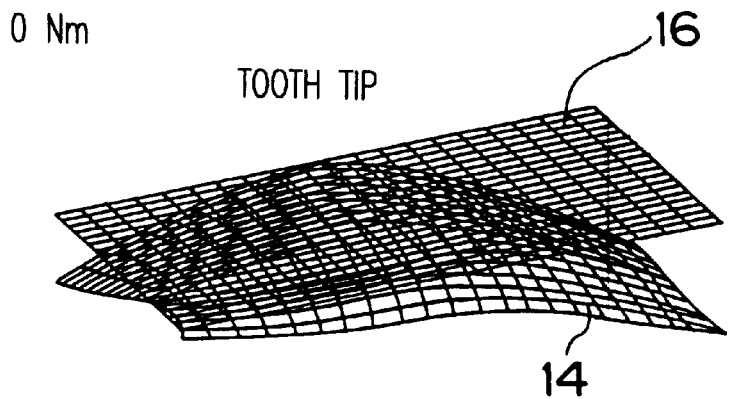
FIG. 2 is a diagram for explaining the tooth surface position that changes according to the working torque owing to misalignment (an angle error of an gear's axis by elastic deformation) caused by elastic deformation of gear supporting members.
Figure 2B:
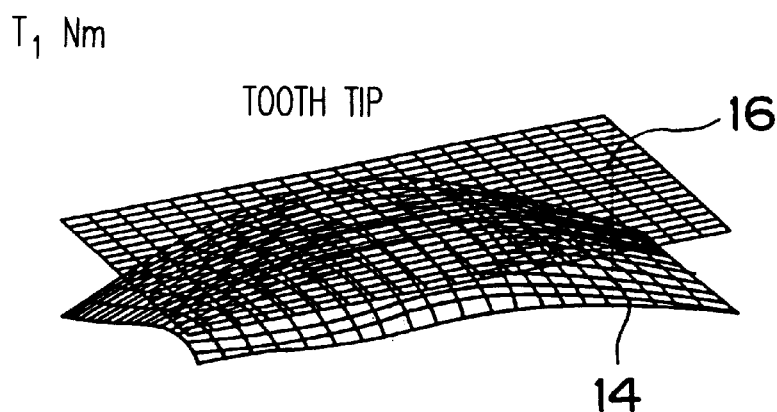
Figure 2C:
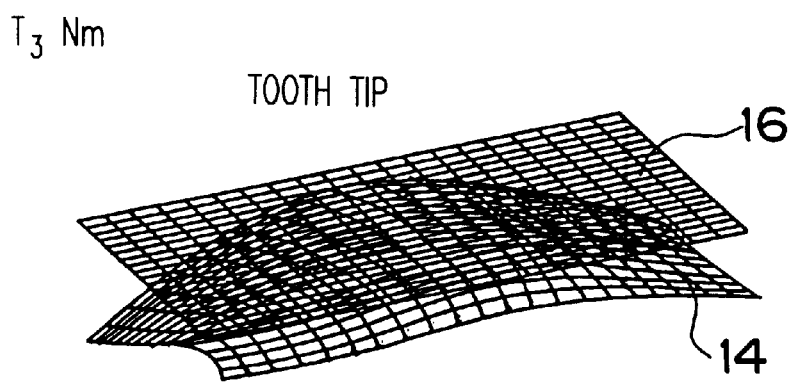
Figure 2D:
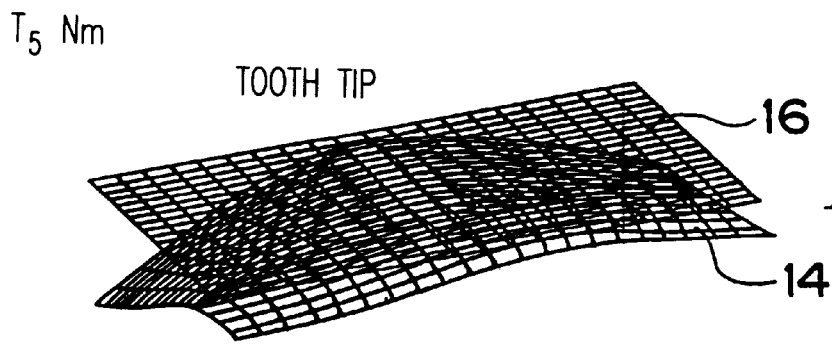
Figure 3A:
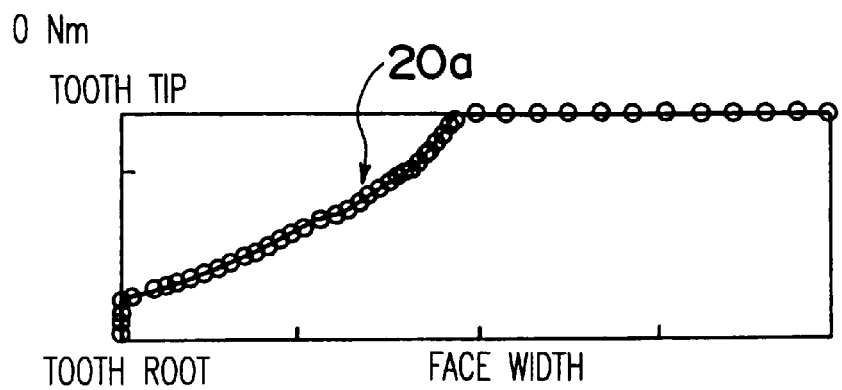
FIG. 3 is a diagram for explaining the change in the locus of contact points in conjunction with change in the tooth surface position as represented in FIG. 2.
Figure 3B:
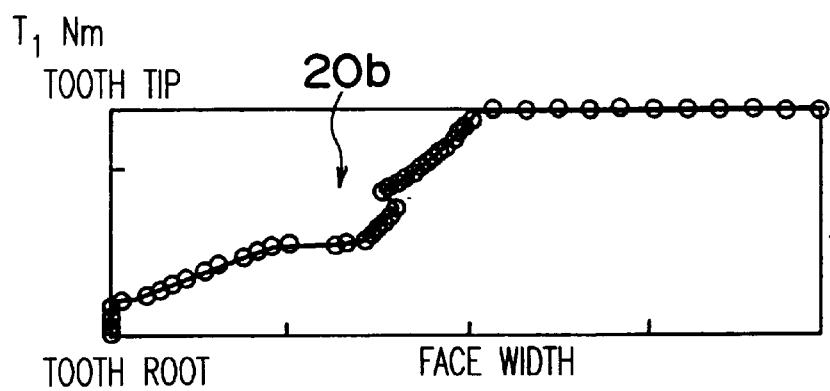
Figure 3C:
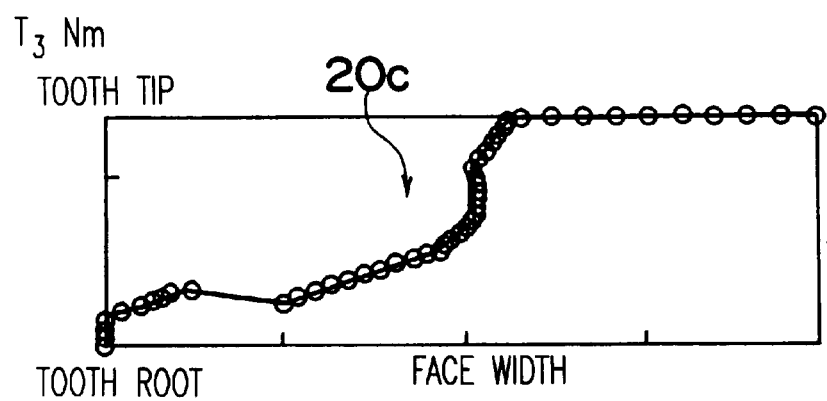
Figure 3D:
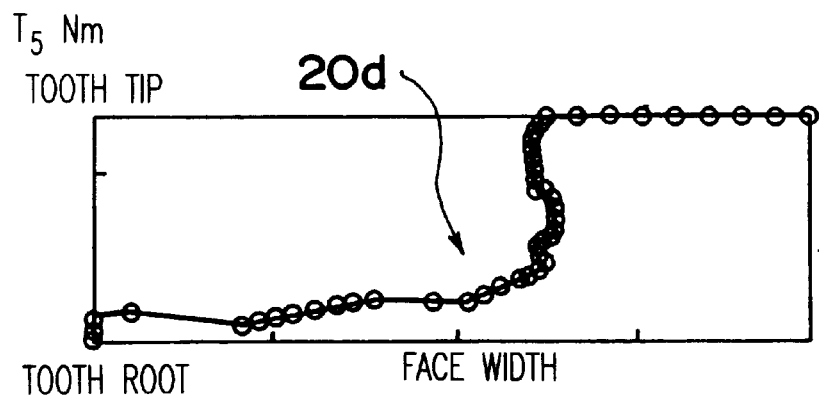
Figure 4:
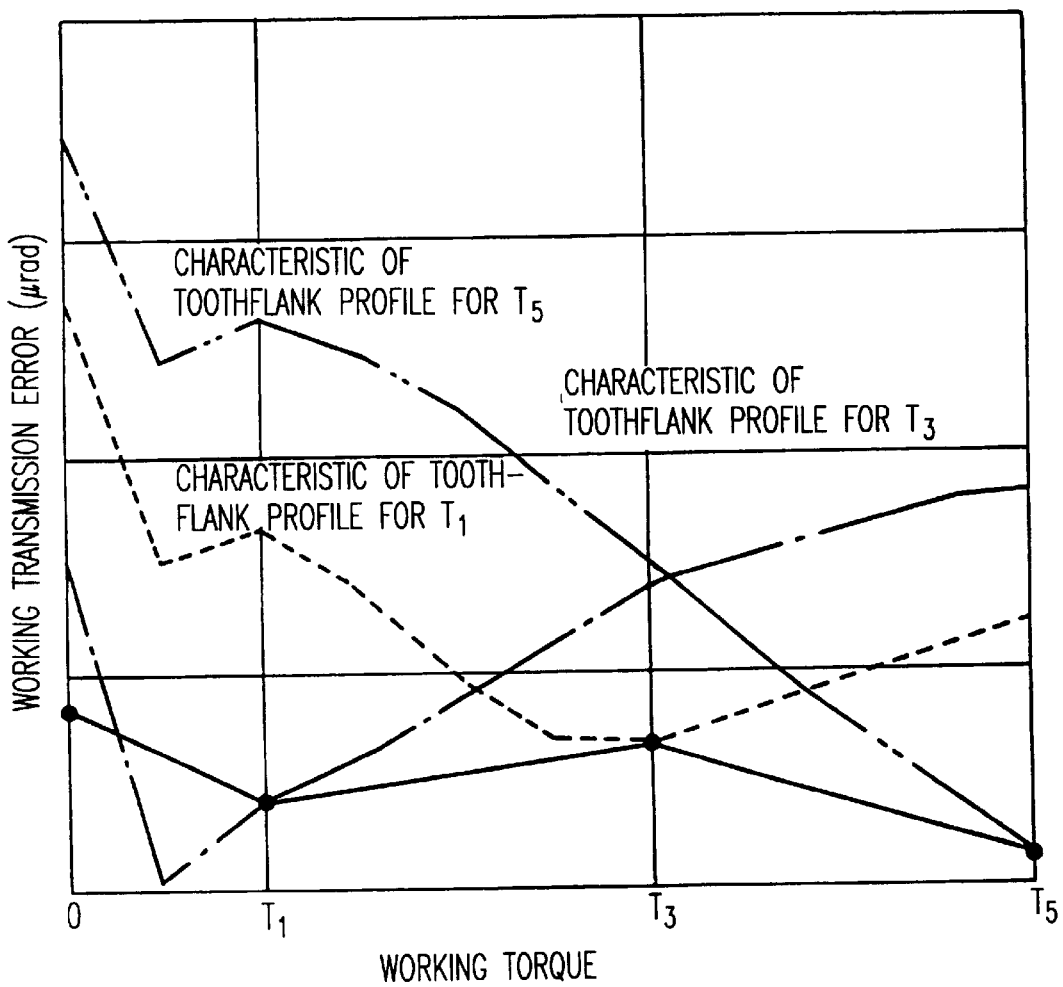
FIG. 4 is a graphical representation showing the torque-dependent characteristic of the working transmission error of the gear as shown in FIG. 1.

A one-dot chain line in FIG. 4 represents the torque-dependent characteristic of the working transmission error at the working torque $T_1$, shown in FIG. 2(b), i.e. the result of a simulation of the working transmission error at continuously changed working torque T with the tooth surface 14 positioned as shown in FIG. 2(b). This indicates that the working transmission error assumes a substantially minimum value at the working torque in the vicinity of $T_1$. A dashed line in FIG. 4, on the other hand, represents the torque-dependent characteristic of the working transmission error at the working torque $T_3$ shown in FIG. 2(c), i.e. the result of a simulation of the working transmission error at continuously changed working torque T with the tooth surface 14 positioned as shown in FIG. 2(c). This indicates that the working transmission error assumes a substantially minimum value at the working torque in the vicinity of $T_3$. Similarly, a two-dot chain line in FIG. 4 represents the torque-dependent characteristic of the working transmission error at the working torque $T_5$ shown in FIG. 2(d), i.e. the result of a simulation of the working transmission error at continuously changed working torque T with the tooth surface 14 positioned as shown in FIG. 2(d). This indicates that the working transmission error assumes a substantially minimum value at the working torque in the vicinity of $T_5$. In other words, as far as each curvature of the convexity of the loci 20b, 20c, 20d of contact points is determined in such a manner that the torque-dependent characteristic of the working transmission error with the tooth surface positions associated with the working torque $T_1$, $T_3$, $T_5$ as described above assumes a substantially minimum value at the working torque in the vicinity of $T_1$, $T_3$, $T_5$, respectively, the result is a small convexity curvature for the portion represented by the locus 20 of contact points in a light load area with a low working torque T and a large convexity curvature for the portion represented by the locus 20 of contact points in a heavy load area with a high working torque T.

With the gear 10 according to this embodiment, as shown by the solid line in FIG. 4, variations in the working transmission error caused by the difference in working torque T are suppressed so that the working transmission error is reduced in a wide working torque range. Also, misalignment caused by deformation of the gear-supporting members under load gives rise to a contact at corners (area where tooth should be contacted sticks out the tooth surface). The increased convexity curvature of the tooth surface 14 for avoiding this inconvenience has so far been considered as a factor to restrain gear performance. In the gear 10 according to this embodiment, however, a superior gear performance (working transmission error) is maintained irrespective of deformation of the gear-supporting members under load, so that a lower rigidity is required for the supporting members, thereby making it possible to reduce both the size and the weight while at the same time securing sufficient strength of the gear tooth as a whole.

Now, an example of a tooth surface modification method employed in designing the gear 10 will be explained with reference to flowchart of FIG. 5. This tooth surface modification method is automatically implemented by a computer having a machine readable recording medium such as ROM, hard disk, etc. having a program recorded therein for executing the required steps (processes) sequentially. The designer is allowed to input predetermined information including the basic specifications such as the modules and the operating conditions of the gear 10, the torque-dependent characteristic of the lead error representing the positional change in the tooth surface 14 due to misalignment caused by elastic deformation of the gear-supporting members, etc., as required, via an input unit such as a keyboard.

Figure 5:
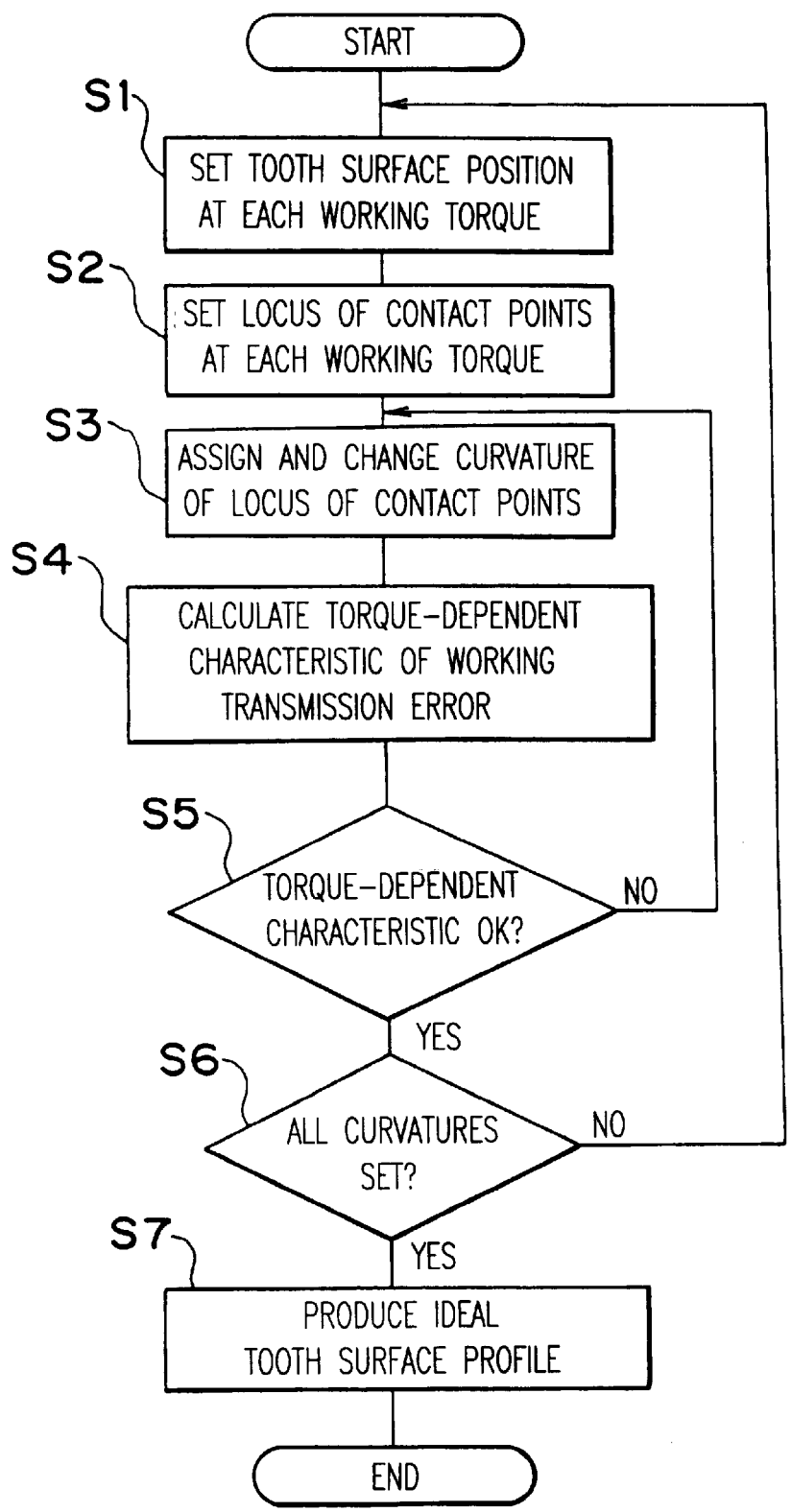
FIG. 5 is a flowchart for explaining an example of a tooth surface modification process used for designing the gear as shown in FIG. 1.
Figure 6:
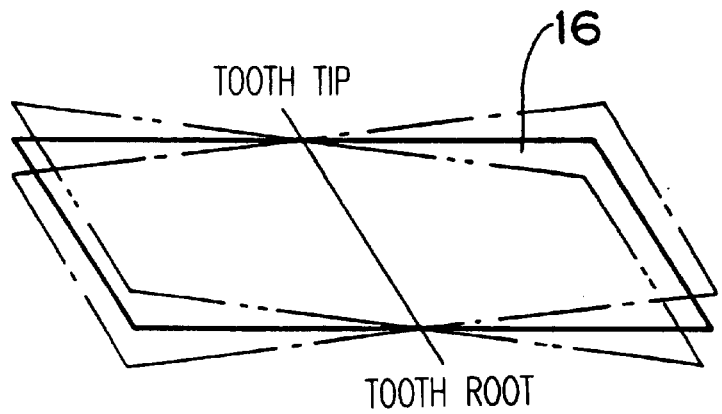
FIG. 6 is a diagram for explaining an example of the tooth surface position set in step S1 of FIG. 5.

In step S1 of FIG. 5, the gear-flank position is set at each of a plurality of preset working torque values. Each number and each value of working torque is determined appropriately in accordance with operating conditions of the gear 10. The tooth surface position is determined, as shown in FIG. 6, according to the working torque value from the torque-dependent characteristic ($\mu$ rad/Nm, etc.) of the lead error set and inputted in advance, for example, on the basis of misalignment. The right tooth surface position is determined in such a manner that the central portion of the tooth surface comes in contact at the working torque most frequently applied, i.e. the working torque in the vicinity of $T_3$. The solid line in FIG. 6 represents the case at the working torque $T_3$, the two-dot chain line at the working torque $T_1$, and the one-dot chain line at the working torque $T_5$. Step S1 corresponds to the process for setting the position. At this stage, the tooth surface is a reference tooth surface 16 before modification, which is flat as shown in FIG. 6.

Figure 7:
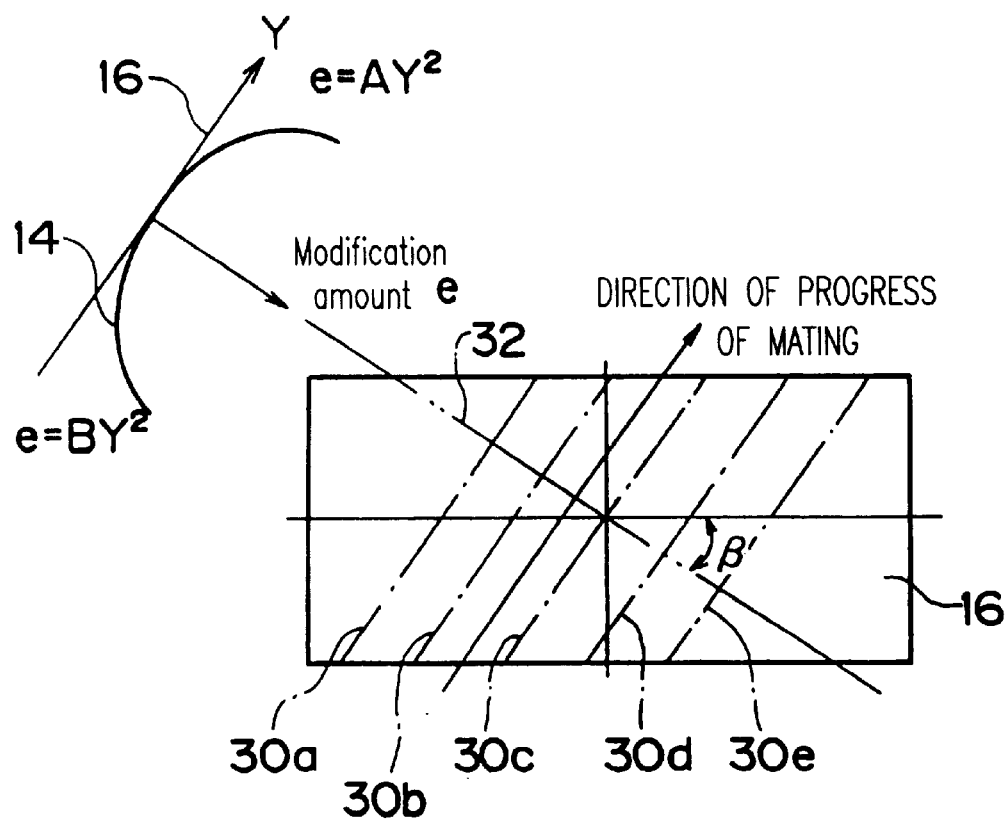
FIG. 7 is a diagram for explaining the locus of contact points set in steps S2, S3 and a method of setting the curvature of the locus.

In step S2, loci 30a to 30e of contact points (hereinafter referred to simply as loci 30 of contact points unless otherwise specified) are set at a plurality of working torque values on the tooth surface 16, for example, as shown by one-dot chain line in FIG. 7. At this stage, the loci 30 of contact points are based only on a prediction and are different from the loci 20 of actual contact points after tooth surface modification. Thus the loci 30 of contact points are determined, for example, as straight lines parallel to the working direction which is perpendicular to a simultaneous line of contact 32 at a helix angle $\beta$, and spaced from each other by distances corresponding to the positional change (lead error) in the tooth surface 16 at each working torque. In FIG. 7, the locus 30c of contact points passing through the center of the tooth surface 16 is formed at the working torque $T_3$, the locus 30a of contact points is formed at the working torque value $T_1$, and the locus 30e of contact points is formed at the torque value $T_5$. Step S2 corresponds to the process for setting loci of contact points. The loci 30 of contact points are desirably set such that the whole area of the tooth surface 16 may be covered.

In step S3, a curvature of a convexity is attached to each of the loci 30 of contact points set in step S2. Specifically, as shown in FIG. 7, each modification amount e separated with respect to the simultaneous contact line 32 passing through the center of the tooth surface 16 is expressed in two-order functions $e=AY^2$ and $e=BY^2$, respectively. The coefficients A, B are set in consideration of the material (modulus of elasticity), etc. of the gear 10 so that a larger curvature is secured for the loci 30 of contact points at a higher working torque value.

Figure 8:
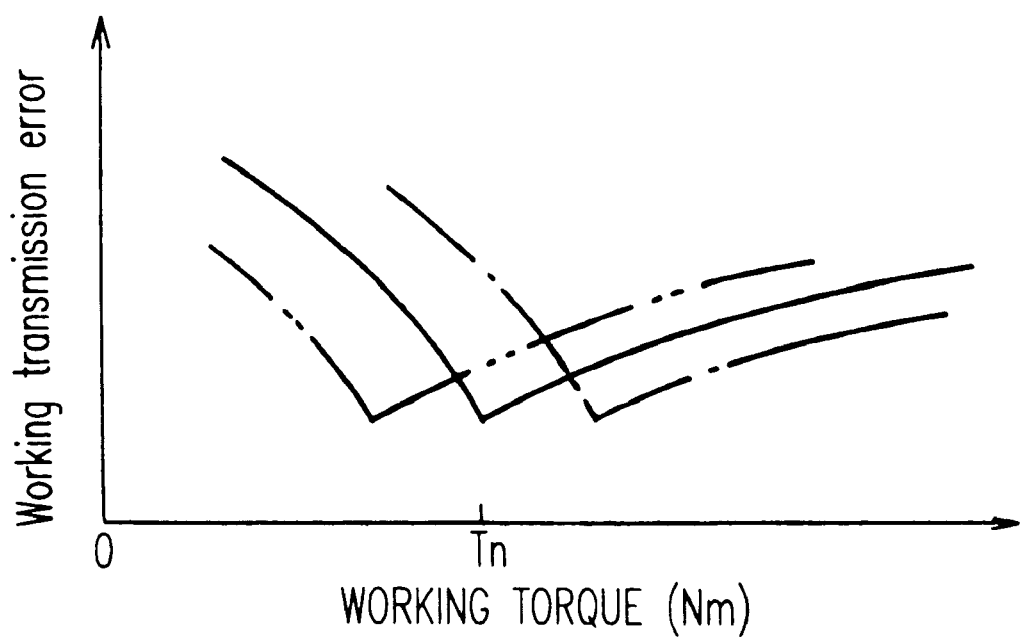
FIG. 8 is a graphical representation for explaining the torque-dependent characteristic of the working transmission error calculated in step S4 of FIG. 5.

In step S4, the torque-dependent characteristic of the working transmission error of the gear in mesh, which is rotated with the tooth surface position thereof corresponding to the current working torque value Tn, is determined in accordance with the simulation program stored in advance. The working transmission error is determined by sequentially changing the working torque, and the characteristic as shown, for example, in FIG. 8 is obtained. Step S5 judges whether the working transmission error assumes a substantially minimum value in the vicinity of the current working torque value Tn. In the case where the working transmission error assumes a substantially minimum value in the vicinity of the torque value Tn as shown by solid line, the curvature of the locus 30 of contact points corresponding to the particular working torque value Tn is judged to be appropriate (OK). Then the process proceeds to step S6 and subsequent step. In the case where the minimum values of the working transmission error deviate from the working torque value Tn as shown by one-dot chain line or two-dot chain line, however, step S3 and subsequent steps are repeated until the answer in step S6 becomes YES.

In the portion of the torque characteristic, the working transmission error assumes a minimum value at a point where the curvature of the locus of contact points at the particular torque is offset by the elastic deformation of the tooth surface. In the case where the working transmission error assumes a minimum value at a torque lower than the working torque value Tn as shown by two-dot chain line in FIG. 8, therefore, the locus 30 of contact points corresponding to the working torque value Tn has a small curvature. Therefore, the coefficients A, B are corrected in Step S3 in such a way to increase the curvature of the corresponding locus 30 of contact points, followed by execution of steps S4, S5. In the case where the working transmission error assumes a minimum value at a torque higher than the working torque value Tn as shown by one-dot chain line in FIG. 8, on the other hand, the resulting excessively large curvature of the locus 30 of contact points corresponding to the working torque value Tn makes it necessary to correct the coefficients A, B in step S3 so as to decrease the curvature of the corresponding locus 30 of contact points, followed by execution of steps S4, S5.

The loci 30 of contact points for modifying the curvature of the convexity are different from the loci 20 of contact points followed by the gear actually rotating in mesh. Since the torque-dependent characteristic of the working transmission error is determined based on the actual loci 20 of contact points by simulation, however, the working transmission error at each working torque value Tn is substantially minimized. Also, in view of the fact that the elastic deformation of the tooth surface increases as the working torque value Tn becomes higher, the curvature of the convexity associated with the locus 20 of actual contact points at a high working torque value Tn can be increased by setting the curvature of the loci 30 of contact points so as to minimize the working transmission error at each working torque value Tn. Specifically, the curvature of the convexity of the loci 20 of contact points increases gently in the order of the loci 20a, 20b, 20c and 20d of contact points. Steps S3 to S5 correspond to the process for setting the curvature.

Step S6 judges whether the curvature of the corresponding loci 30a to 30e of contact points is completely set at all the working torque values. The convexity curvatures are set sequentially for all the loci 30 of contact points in step S3 and subsequent steps while at the same time setting the position of the tooth surface in accordance with each working torque value in step S1. In step S7, the convexity of the loci 30a to 30e of contact points are smoothly connected three-dimensionally to each other thereby introducing an ideal tooth surface. Thus, a modified tooth surface 14 is obtained.

A predetermined locus 30 of contact points is set at each working torque value in the above-mentioned embodiment. Since the actual locus of contact points changes each time when a curvature is added or changed, however, the loci 30 of contact points can be sequentially changed so as to approach the corresponding actual loci of contact points.

Since certain changes may be made in the above gear and method without departing from the scope of the invention herein involved, it is intended that all matter contained in the above description or shown in the accompanying drawings shall be interpreted as illustrative but not in a limiting sense.

What is claimed is:

1. A method of modifying the tooth surface of a gear to be meshed with a mating gear, comprising the steps of:

setting a position of a tooth surface at each of a plurality of working torque values that varies owing to elastic deformation in the gear to be meshed;

setting a different locus of contact points with a tooth surface of the mating gear at each of the plurality of said working torque values; and setting a curvature of convexity of a locus of contact points so as to substantially minimize a torque-dependent characteristic of a working transmission error at each of the plurality of working torque values corresponding to different positions of the tooth surface of said gear rotated in mesh with the mating gear.

2. A gear with modified tooth surface, wherein:

a position of a tooth surface that changes with a working torque owing to elastic deformation in the gear is set at each of a plurality of working torque values;

a different locus of contact points with a tooth surface of a mating gear is set at each of the plurality of working torque values; and a curvature of a convexity of a locus of the contact points is set so as to substantially minimize a torque-dependent characteristic of a working transmission error at each of the plurality of said working torque values corresponding to different positions of said tooth surface of said gear rotated in mesh with the mating gear, said gear being machined and fabricated based on said convexity.

* * * * *